United States Patent [19]
Ertel et al.

[11] Patent Number: 5,875,883
[45] Date of Patent: Mar. 2, 1999

[54] ADJUSTABLE INCLINED CONVEYOR

[75] Inventors: Daniel E. Ertel; Michael A. Hosch, both of Oconomowoc, Wis.

[73] Assignee: Dorner Mfg. Corp, Hartland, Wis.

[21] Appl. No.: 702,404

[22] Filed: Aug. 14, 1996

[51] Int. Cl.[6] ................................................. B65G 15/08
[52] U.S. Cl. ........................ 198/821; 198/840; 198/861.2
[58] Field of Search ..................................... 198/821, 824, 198/840, 842, 861.2, 861.3

[56] References Cited

U.S. PATENT DOCUMENTS

| | | | |
|---|---|---|---|
| 1,746,127 | 2/1930 | Overholt | 198/840 |
| 3,572,496 | 3/1971 | Cutts et al. | 198/861.2 |
| 4,676,367 | 6/1987 | Nolte | 198/821 |
| 5,090,550 | 2/1992 | Axmann | 198/861.3 |
| 5,156,260 | 10/1992 | Dorner et al. | |
| 5,174,435 | 12/1992 | Dorner et al. | |

*Primary Examiner*—Joseph E. Valenza
*Attorney, Agent, or Firm*—Andrus, Sceales, Starke & Sawall

[57] ABSTRACT

A conveyor comprising a first conveyor section and a second conveyor section which can be pivoted from a first position where it is in alignment with the first conveyor section to a second position where it is at an inclined angle with respect to the first conveyor section. A shaft pivotally connects the adjacent ends of the two conveyor sections together, and a spindle or pulley is journaled on the shaft and supports an endless belt in travel in a conveying run and a return run on the conveyor sections. A slide is mounted for sliding movement on each side rail of the first conveyor section and each slide carries a hold down roller which rides against the side edge of the upper working surface of the belt and hold the belt tangent to both the first and second conveyor sections. Each slide is also provided with a rack which is engaged with a gear that is fixed to the second conveyor section and is positioned concentrically of the pivot shaft. As the second conveyor section is pivoted relative to the first conveyor section, rotation of the gear moves the rack and slide plate move linearly to thereby change the position of the hold down roller relative to the spindle, thus maintaining the belt in a relatively taut condition.

18 Claims, 4 Drawing Sheets

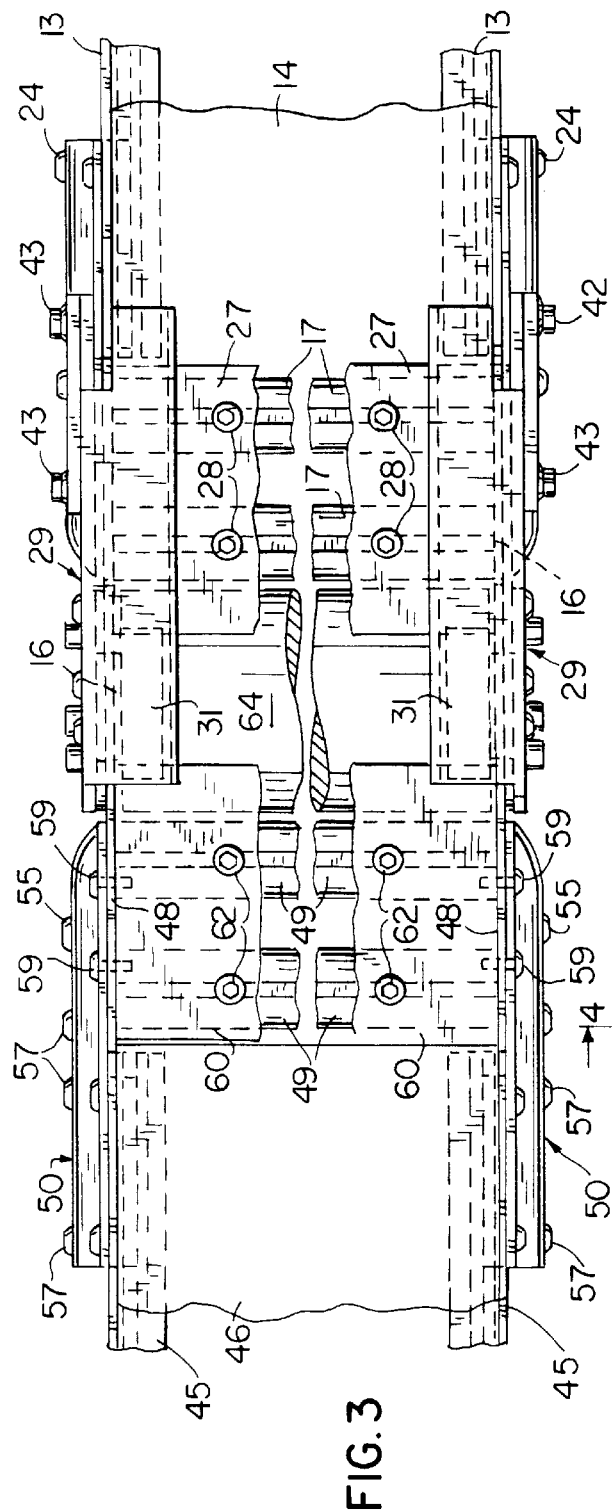
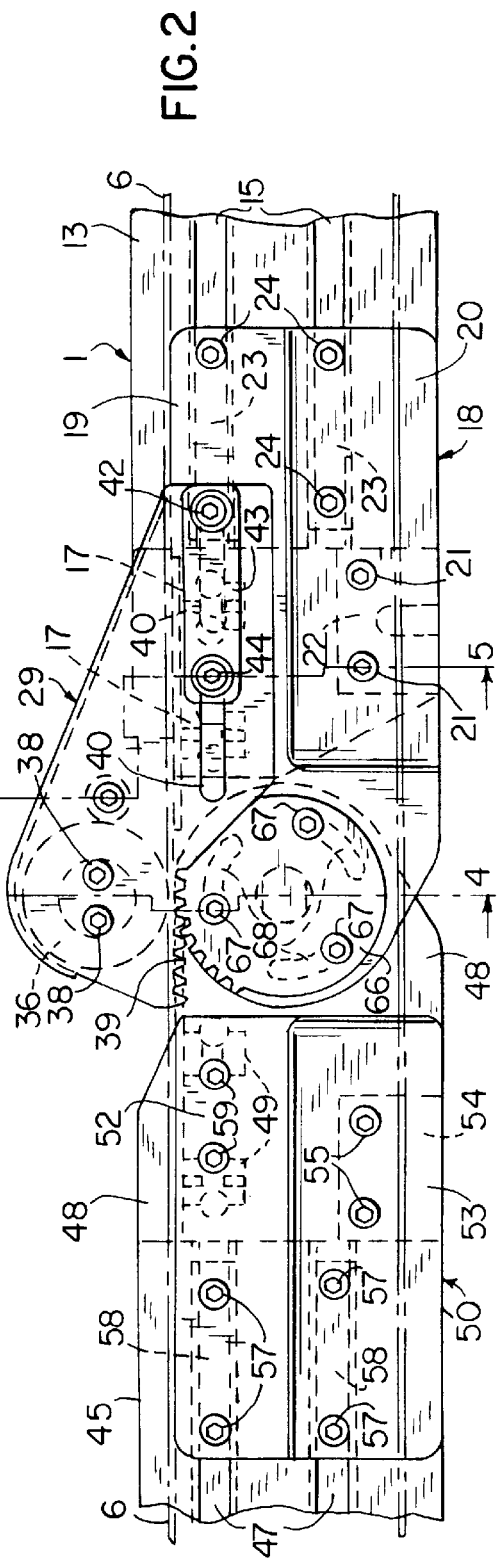
FIG. 2
FIG. 3

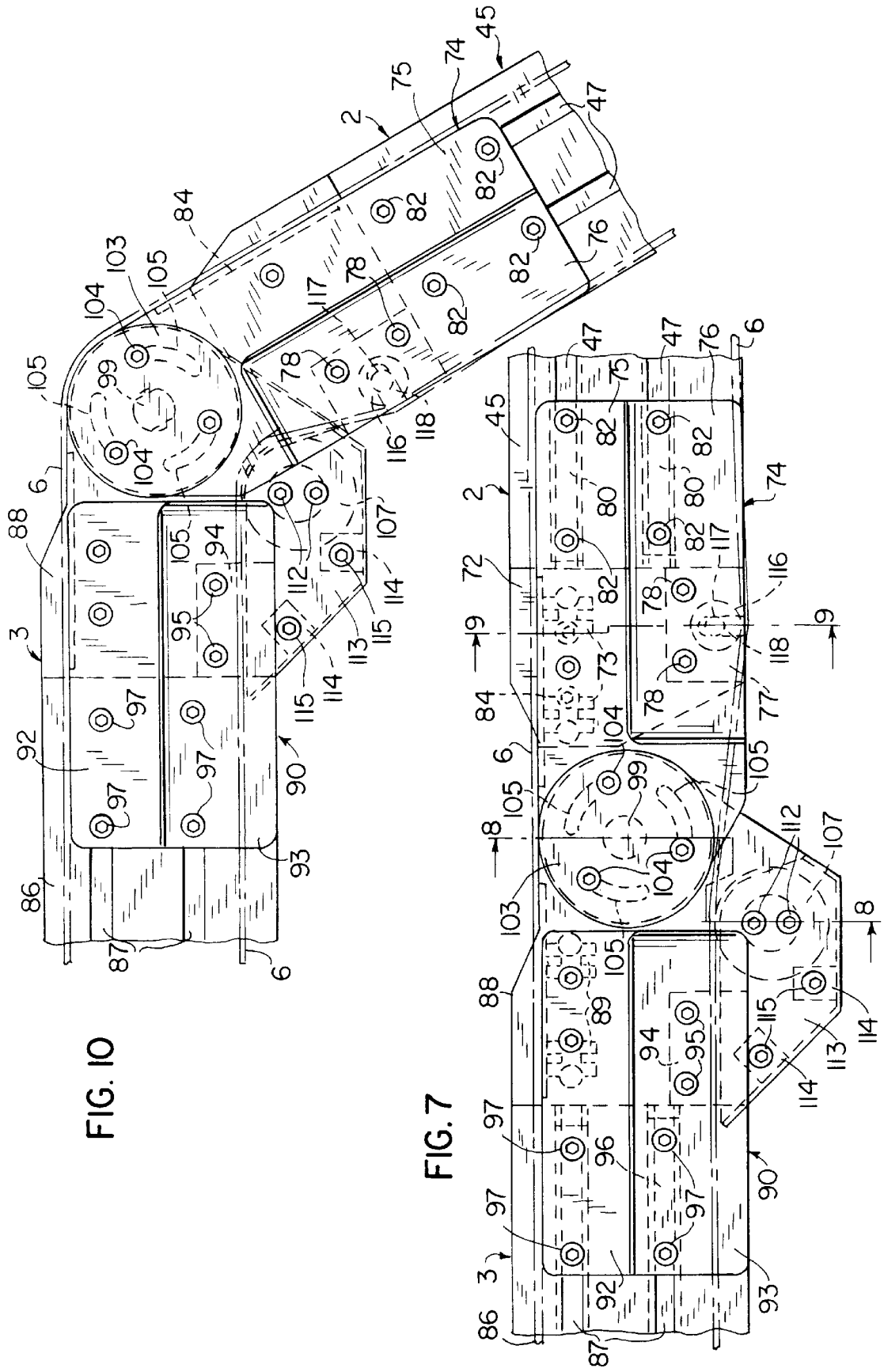

ADJUSTABLE INCLINED CONVEYOR

BACKGROUND OF THE INVENTION

A conveyor system for conveying small articles often includes an inclined conveyor section for transferring articles from one level to another. When the incline is relatively shallow, generally below 30°, a flat belt can be used in the inclined conveyor section to convey the articles between the lower and upper levels. However, if the incline is relatively steep, a cleated conveyor is normally used in which cleats are mounted on the working surface of the conveyor belt and extend transversely of the belt.

In the past, the inclined configuration has been provided by utilizing separate lower, inclined and upper conveyors. The use of separate conveyors requires a separate drive system for each conveyor including a motor and transmission, as well as a structural tie-in between the independent conveyors. The use of independent drive systems for each conveyor can substantially increase the overall cost of the conveyor system.

As a further problem, the ends of the independent conveyors in the inclined system are normally in overlapping relation, and if cleated conveyors are utilized, the overlap may be several inches in height to accommodate the cleats. As articles pass across the overlapping junction between the conveyors, they may tumble and loose orientation on the conveyor.

To eliminate the problems and the cost associated with the use of separate conveyors in an inclined system, it has been proposed to use a single belt which travels from the lower conveyor section to the inclined section and then to the higher elevation section. In a system using a single belt, the belt passes through an inside corner in moving from the lower conveyor section to the inclined section, and in order to maintain the belt against the conveyor bed, hold down rollers are normally employed at the inside corner to hold the belt against the conveyor bed. With a single belt conveyor of this type, pivotal adjustment of the inclined conveyor section is normally made around the axis of the hold-down roller and an adjustment of the inclined conveyor section will change the belt length in the return run, with the result that a large capacity belt tensioning mechanism is required. Further, as the conveyor sections pivot relative to each other about the axis of the hold-down roller, there is a lack of structural tie-in between the frames of the two conveyor sections which requires additional reinforcement to maintain the structural integrity of the conveyor at this location.

SUMMARY OF THE INVENTION

The invention is directed to an improved, adjustable, inclined conveyor system, and in particular to a system in which the inclined conveyor section is pivoted about the pivotal connection between the conveyor sections and the hold-down rollers are moved relative to the pivot axis to maintain the belt in proper contact with the conveyor bed.

In accordance with a preferred embodiment of the invention, the conveyor includes a lower level conveyor section, an upper level conveyor section that is generally parallel to the lower level section, and an adjustable inclined section that connects the lower level and upper level sections. A single endless conveyor belt is mounted for travel on the three conveyor sections in an upper conveying run and a lower return run. The conveying run of the belt passes through an inside corner in traveling from the lower level conveyor section to the inclined conveyor section and passes over an outside corner in traveling from the inclined section to the upper level section.

Both the lower level conveyor section and the inclined conveyor section are each provided with a pair of spaced side members and the adjacent ends of the side members are pivotally connected together by a transverse shaft. Journaled on the shaft is a spindle or pulley which supports the conveyor belt that extends across the inside corner between the lower level and inclined conveyor sections.

A slide is mounted for longitudinal sliding movement on the end of each side member of the lower level conveyor section, and each slide carries a hold down roller which rides on the side edge portion of the upper working surface of the conveyor belt and holds the belt tangent to both the lower and inclined conveyor sections. Also mounted on each slide is a rack, and the teeth of the rack are engaged with the teeth of a gear that is fixed to each side member of the inclined conveyor section. The gears are located in axial alignment with the pivot shaft.

As the inclined conveyor section is pivoted relative to the lower level conveyor section, rotation of the gears will drive the corresponding racks and slides in a linear path, thus moving the hold-down rollers relative to the pulley or spindle and changing the point of tangency between the hold-down rollers and the conveyor sections. When the inclined conveyor section has been pivoted to the desired angle with respect to the lower level section, the inclined conveyor section can be locked in that position.

The side members of the inclined conveyor section are pivoted to the side members of the upper section through a pivot shaft that carries a spindle. The spindle supports the conveying run of the conveyor belt at an outside corner. The return run of the conveyor belt passes across an inside corner between the upper conveyor section and the inclined section. As the return run is not required to maintain engagement with a bed, the position of the return run is not as critical as that of the conveying run. As a feature of the invention, a roller is mounted to the undersurface of each side member of the upper level conveyor section, and rides against the side edges of the working surface of the return run of the conveyor belt. In addition, when using a cleated belt, a tapered roller extends between the side members of the inclined conveyor section and is adapted to ride against the non-working surface of the return run of the belt. The end portions of the tapered roller have a greater diameter than the central portion, thus creating a slight upward bulge in the central portion of the belt.

The adjustable conveyor system of the invention can be utilized with a pair of conveyors in which one conveyor section is horizontal, and the other conveyor section is at an inclined angle, or can be utilized with three conveyor sections in which a central inclined section connects upper and lower horizontal sections. The system of the invention can be utilized either with a flat belt or a cleated belt without any modification of the construction.

Through use of the invention, the inclined conveyor section can be adjusted infinitely through an angularity up to about 60°, and the structural integrity between conveyor sections is retained at all angularities.

The rack and gear system transforms the rotary motion into linear motion, and synchronizes the action at both sides of the conveyor to prevent jamming during the change of angularity.

Other objects and advantages will appear during the course of the following description.

DESCRIPTION OF THE DRAWINGS

The drawing illustrate the best mode presently contemplated of carrying out the invention.

3

Figure 1:
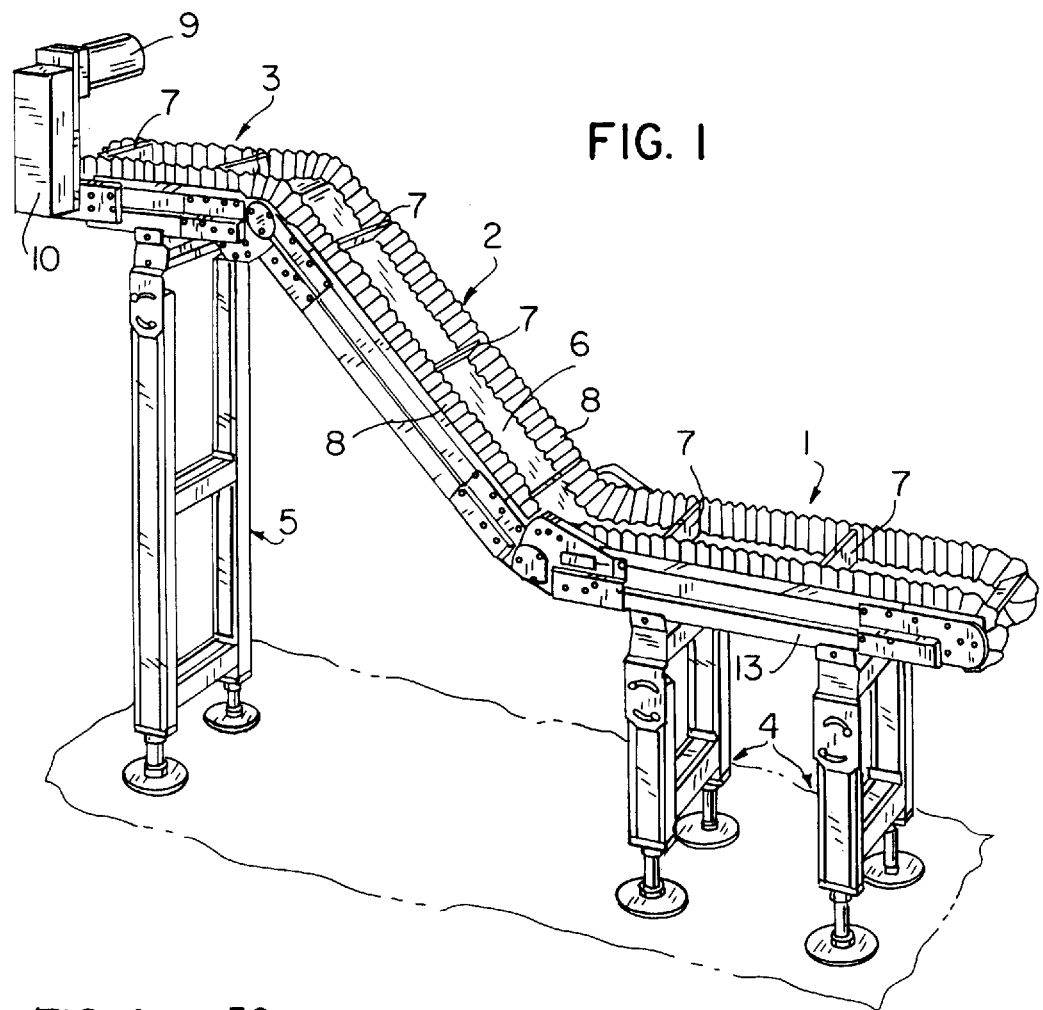
Figure 4:
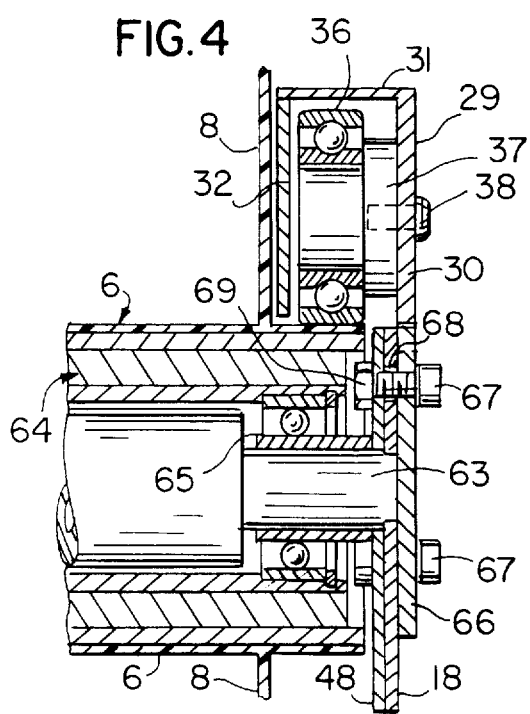
Figure 5:
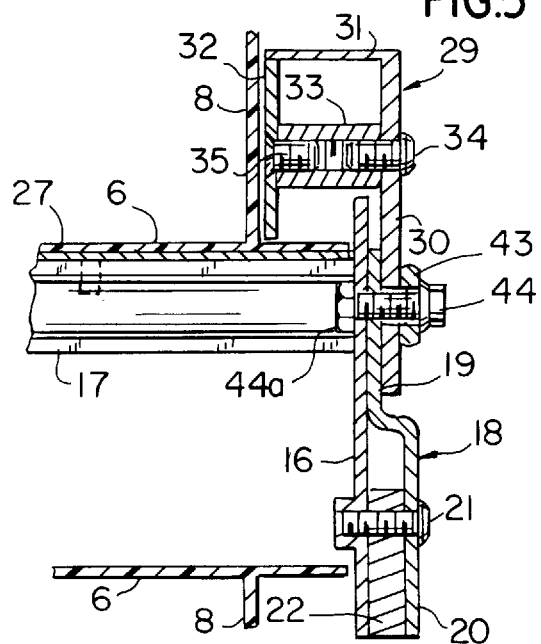
Figure 6:
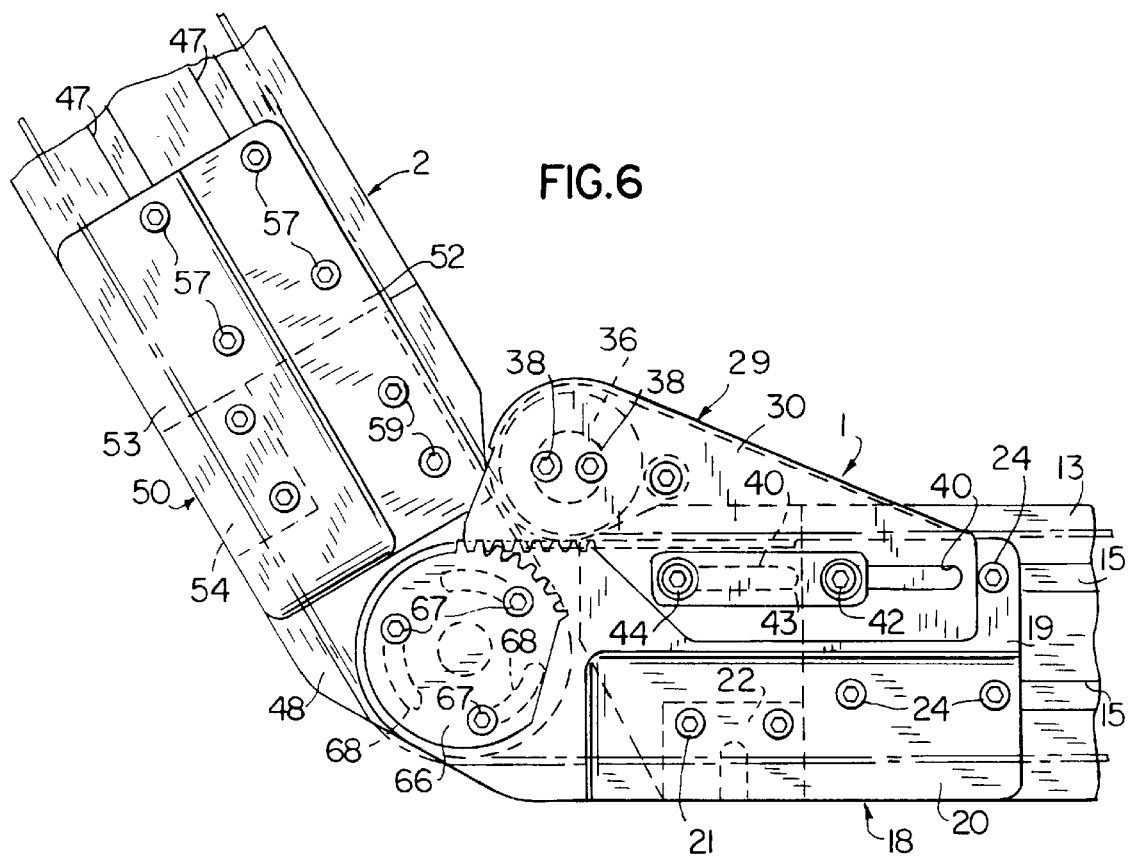
Figure 8:
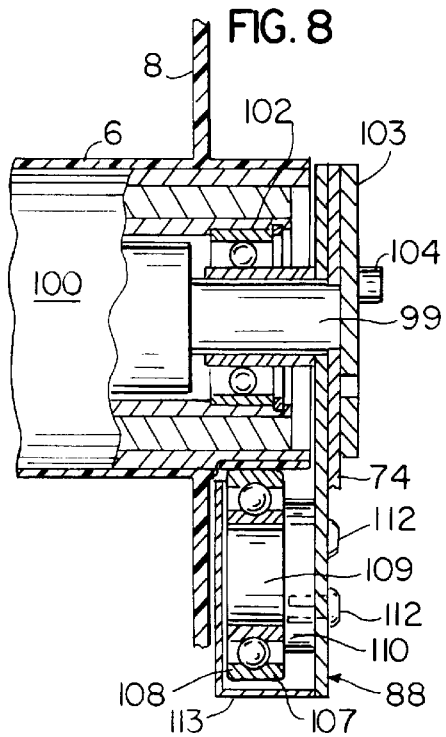
Figure 9:
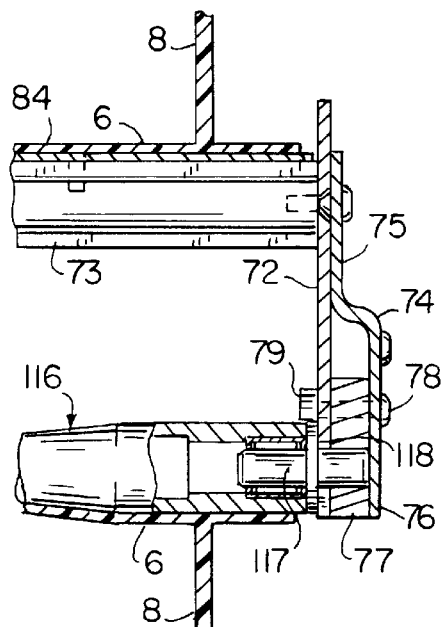

In the drawings:

FIG. 1 is a perspective view of the inclined conveyor system of the invention;

FIG. 2 is a side elevation of a portion of the conveyor system;

FIG. 3 is a top view of the construction shown in FIG. 2;

FIG. 4 is a section taken along line 4—4 of FIG. 2;

FIG. 5 is a section taken along line 5—5 of FIG. 2;

FIG. 6 is a view similar to FIG. 2 showing the inclined conveyor section at an upward angle;

FIG. 7 is a side elevation of a second portion of the conveyor system with the conveyor sections being shown in an aligned position;

FIG. 8 is a section taken along line 8—8 of FIG. 7;

FIG. 9 is a section taken along line 9—9 of FIG. 7; and

FIG. 10 is a view similar to FIG. 7 showing the inclined conveyor section at a downward angle.

DESCRIPTION OF THE ILLUSTRATED EMBODIMENT

The drawings illustrate an improved adjustable conveyor system for conveying relatively small articles. As illustrated in FIG. 1, the conveyor system includes a lower, generally horizontal conveyor section 1, an inclined central conveyor section 2, and an upper, generally horizontal conveyor section 3. The lower section 1 is supported from the ground or foundation by a pair of frames 4 while the upper section 3 can be supported by a frame 5.

A single, endless conveyor belt 6 is mounted for travel on the three conveyor sections 1, 2 and 3 in an upper conveying run and a lower return run. As shown in FIG. 1, a series of cleats 7, which extend transversely of belt 6, can be mounted on the upper surface of belt 6. In addition, belt 6 is provided with a flexible, corrugated side edges 8, each of which extends throughout the entire length of the belt and prevents the articles from falling from the side edges of the belt. While the drawings show the use of a cleated belt, it is also contemplated that a flat, non-cleated belt can be utilized, in which case the conveyor sections 1, 2 and 3 would normally include side rails that prevent the articles from falling from the side edges of the flat belt.

As shown in FIG. 1, belt 6 is driven in an endless path by a drive system which includes a motor 9 that is connected through a transmission, not shown, to a drive spindle or pulley which is located at the end of section 3. A suitable shield or cover 10 can be mounted over the transmission.

Lower conveyor section 1 includes a pair of spaced, parallel side rails 13, which can be constructed as shown in U.S. Pat. No. 5,156,260. Side rails 13 can be connected together by a series of cross bars, not shown, which extend transversely between the side rails, as described in the aforementioned patent, and a flat conveyor bed 14 is mounted on the cross bars, and serves to support conveyor belt 6.

Each side rail 13 is formed with a pair of parallel slots 15 which are generally T-shaped in cross section.

As best illustrated in FIGS. 3–5, an inner end plate 16 is located in abutting relation with the end of each side rail 13, and the end plates are connected together by cross bars 17 which extend transversely of the conveyor section 1.

Located on the outer surface of each end plate 16 is an outer plate 18. Plate 18 is formed with an upper section 19 which is positioned flatwise against the end plate 16 and a lower section 20, which is offset outwardly and is connected to end plate 16 by bolts 21. A spacer block 22 is positioned between section 20 and end plate 16, as best shown in FIG. 5, and bolts 21 extend through blind holes in the spacer block, Outer plate 18 is connected to the respective side rail 13 through use of T-shaped blocks 23 which are mounted for sliding movement within the slots 15 in the side rail. Screws 24 extend through holes in plate 18 and are threaded to the T-blocks, thus drawing the blocks outwardly against the lips bordering the slot to secure the plate 18 to the side rail 13.

As shown in FIG. 3, a flat bed extension 27 is mounted to the cross bars 17 by screws 28. One end of bed extension 27 is in abutting relation with the corresponding end of bed 14, thus forming an extension to bed 14 and serving as a support for belt 6.

Mounted for sliding movement on each outer plate 18 is a slide 29. As best shown in FIGS. 4 and 5, slide 29 includes a vertical section 30, an upper horizontal section 31 which extends laterally inward from the upper edge of each vertical section 30, and an inner vertical section 32 which is parallel to section 30. Inner section 32 is connected to section 30 through a spacer sleeve 33 which extends between sections 30 and 32 and a bolt 35 extends through an opening in section 30 and is threaded in the sleeve 34, while screw 35 projects through an opening in section 32 and is threaded in the opposite end of sleeve 33, as shown in FIG. 5.

Each slide 29 carries a hold down roller 36 that is adapted to ride against a side edge of the upper working surface of belt 6 at the inside corner between conveyor sections 1 and 2. As best shown in FIG. 4, an arbor 37 is located between the vertical sections 30 and 32 of each slide 29, and is connected to section 30 by screws 38. Each roller 36 is journaled by suitable bearings on arbor 37 and engages the side edge portion of belt 6, as shown in FIG. 4.

Each slide 29 is formed with a rack 39, the teeth of which engage the teeth of a gear as will be hereinafter described.

Slide 29 is mounted for linear sliding movement relative to plates 16 and 18. To provide the sliding movement, a pair of aligned elongated slots 40 are formed in the vertical section 30 of slide 29, as seen in FIG. 2. A screw 42 extends through an opening in block 43 and through one of the slots 40 and is engaged with the upper T-block 23, while a second screw 44 extends through an opening in block 43 and through the other slot 40 and is engaged with a press nut 44a that is located on the inner surface of plate 16, as best shown in FIG. 5. By releasing screws 42 and 44, slide 29 can move or slide relative to plates 16 and 18.

Inclined section 2 can be pivoted relative to lower section 1 from a position, as shown in FIG. 2, in which the two sections 1 and 2 are in alignment to an inclined position as shown in FIG. 6, in which conveyor section 2 is located at an acute angle with respect to the horizontal.

Inclined conveyor section 2 is similar in construction to conveyor section 1, and includes a pair of side rails 45 which are connected together by a series of spaced cross bars, not shown. A bed 46 is mounted on the cross bars and extends between rails 45 and serves to support belt 6 in travel.

As in the case of side rails 13, each side rail 45 is provided with a pair of parallel slots 47 which are generally T-shaped in cross section. An inner end plate 48 is positioned in abutting relation with the end of each side rail 45, and end plates 48 are connected together by a pair of cross bars 49 similar to cross bars 17.

Each inner plate 48 and the corresponding side rail 45 are connected together by an outer plate 50, which is composed of an upper section 52 that is positioned flatwise against inner plate 48 and an outwardly offset lower section 53 which is spaced outwardly of inner plate 48.

A spacer block 54 is positioned between lower offset section 53 and inner plate 48, and a pair of bolts 55 extend through aligned openings in section 53 and spacer 54, and receive suitable nuts.

Outer plate 50 is connected to the respective side rail 45 through screws 57 which are engaged with T-blocks 58 that are mounted for sliding movement in slots 47 in the side rail. By threading down screws 57, the T-blocks 58 will be drawn outwardly against the lips bordering slots 47 to secure the outer plate 50 to the side rails 45. In addition, screws 59 extend through aligned openings in outer plate 50 and inner plate 48, and are engaged with threaded openings in the ends of cross bars 49. With this construction, each side rail 45 is integrally connected to the corresponding inner end plate 48 and the outer plate 50.

As in the case of the lower conveyor section 1, a bed extension 60 is mounted on the upper surfaces of the cross bars 49 by screws 62, which engage slide blocks, not shown, that are slidable within longitudinal slots in the cross bar. One end of bed extension 60 abuts the end of bed 46 and serves to support conveyor belt 6.

As shown in FIGS. 2 and 4, outer plate 18 overlaps the end of the inner plate 48, and the overlapping ends are connected together by a shaft 63. Each end of shaft 63 passes through a circular opening in the plate 48 and each outer extremity of shaft 63 is formed with a generally D-shaped configuration, which is received within a corresponding D-shaped opening in the outer plate 18. With this construction, shaft 63 is fixed to the plates 18 of conveyor section 1, while plates 48 of conveyor section 2 can pivot relative to the shaft. Journaled on shaft 63 is a pulley or spindle 64 which supports belt 6 in travel. Internal bearings 65 are located at each end of shaft 63 inwardly of the plates 48 and serve to support the spindle 64 for rotation.

A gear 66, having a series of teeth which mesh with the teeth of rack 39, is secured to each plate 48 of conveyor section 2 and is mounted concentrically of shaft 63. Bolts 67 extend through openings in gear 66, through arcuate slots 68 in plate 18, through holes in plate 48, and the inner ends of bolts 67 receive press nuts 69. By releasing bolts 67, conveyor section 2 can be pivoted relative to conveyor section 1, and conversely threading down bolts 67 will lock the two conveyor sections at a given position.

As previously noted, conveyor section 2 can be pivoted between a position as shown in FIG. 2, where it is in alignment with conveyor section 1 to an inclined position as shown in FIG. 6. To pivot inclined section 2, bolts 67 are released, locking screws 42 and 44 are released, and the tension on the belt 6 is also released. As shown in FIG. 2, belt 6 is trapped between the spindle 64 and the hold-down rollers 36, and the point of tangency between the spindle and each roller is in vertical alignment with the axis of shaft 63.

As conveyor section 2 is pivoted upwardly about the axis of shaft 63, gear 66 will rotate, thus moving the rack 39 in a linear direction. As both the rack 39 and hold down rollers 36 are carried by slide 29, the hold down rollers will correspondingly move, changing the point of tangency between the rollers 36 and the spindle 64, as shown in FIG. 6. When the conveyor section 2 has been pivoted to the desired angle, bolts 67, as well as screws 42 and 44 can be tightened down, thus locking the inclined section 2 at the desired inclined position. Proper tension on the belt can then be restored through a conventional tensioning mechanism.

Conveyor sections 2 and 3 can be pivoted relative to each other, and in an inclined attitude as shown in FIG. 1, the upper section 3 is generally horizontal while the section 2 is inclined downwardly from the section 3. FIGS. 7–10 illustrate the connection between the conveyor sections 2 and 3.

Conveyor section 2 includes an inner plate 72 which abuts the end of each side rail 45, and inner plates 72 are connected together by a pair of cross bars 73, similar to cross bars 17. An outer plate 74 is joined to each side rail 45 and the corresponding inner plate 72. Each outer plate 74 includes an upper section 75 that is disposed flatwise against inner plate 72, as shown in FIG. 9, and a lower offset section 76. Spacer block 77 is positioned between the offset lower section 76, and the lower portion of inner plate 72 as shown in FIG. 9. Bolts 78 extend through aligned openings in lower section 76 and inner plate 72, and the inner ends of bolt 78 receive suitable nuts 79, thus securing the lower section 76 of outer plate 74 to inner plate 72.

Each outer plate 74 is joined to the end of the respective side rail 45 by T-blocks 80, which are located within T-shaped slots 47 in side rail 45. Screws 82 extend through suitable openings in outer plate 74 and are threaded in the T-blocks 80. By threading down the screws 82, T-blocks 80 are drawn outwardly against the lips bordering the slots 47, thus securing the outer plate 74 to the respective side rail 45. With this construction, each side rail 45 is tied into the inner plate 72 and outer plate 74, thus forming an integral side member.

A bed extension plate 84, similar to plates 27 and 60, is mounted on the cross bars 73 that extend between the inner plates 72 and forms an extension to bed 46 to thereby support the belt 6 in travel. Bed extension 84 can be secured to the cross bars by a series of screws, not shown, in the manner of previously described in connection with the attachment of bed extension 27 to cross bars 17.

The upper conveyor section 3 includes a pair of spaced parallel side rails 86, which are similar in construction to side rails 13 and 45. Each side rail 86 is provided with a pair of generally parallel slots 87 which have a T-shaped cross section.

An inner plate 88 is positioned in abutting relation with the end of each side rail 86, and a pair of cross bars 89 extend transversely across the conveyor section and are connected between the inner plates 88.

An outer plate 90 is connected to the outer surfaces of each side rail 86 and the corresponding inner plate 88. Each outer plate 90 includes an upper section 92 and an outwardly offset lower section 93. Spacer 94 is positioned between the offset lower section 93 and the lower portion of inner plate 88, and a pair of bolts 95 extend through aligned openings in lower section 93, spacer 94, and inner plate 88 and the inner ends of bolts 95 receive suitable nuts, not shown. Bolts 95 serve to connect outer plate 90 to inner plate 88.

Each outer plate 90 is connected to the corresponding side rail 86 by T-blocks 96 which are mounted for sliding movement within the slots 87. Screws 97 extend through holes in outer plate 90 and are received within the T-blocks. By threading down the screws 97, the T-blocks 96 will be drawn outwardly against the lips bordering the slots 87 to thereby secure each outer plate 90 to the respective side rails 86. This connection provides an integral side member consisting of each side rail 86 and the corresponding inner plate 88 and outer plate 90.

As shown in FIG. 8, the end of outer plate 74 of conveyor section 2, and the end of inner plate 88 of conveyor section 3 are in overlapping relation and a shaft 99 interconnects the overlapping ends. As best shown in FIG. 8, each end of shaft 99 projects freely through an opening in plate 88 and the outer extremity of each shaft end has a generally D-shaped configuration, which is received within a D-shaped opening in outer plate 74, thus preventing relative rotation between the shaft and plate 74. However, inner plate 88, along with conveyor section 3, can pivot relative to shaft 99.

As shown in FIG. 8, a spindle or pulley 100 is journaled on shaft 99 by a pair of bearings 102, and belt 6 is adapted to ride on the outer surface of spindle 100. In this regard, FIG. 7 shows the conveyor sections 2 and 3 in alignment, while FIG. 10 shows the conveyor section 2 located at an angle with respect to conveyor section 3, and in this configuration the spindle 100 is located at an outside corner.

The two overlapping plates 74 and 78 can be locked together by a disc 103. Bolts 104 extend through openings in disk 103, through arcuate slots 105 in plate 74, and through aligned holes in plate 88. The inner ends of bolts 104 receive suitable nuts, not shown. By releasing bolts 104, conveyor section 2 can be pivoted relative to conveyor section 3. Conversely, by tightening down the bolts 104, the two conveyor sections 2 and 3 will be locked together in a given position.

The edge portions of the conveying surface of the return run of belt 6 are supported by a pair of rollers 107, as seen in FIG. 8. Each roller 107 is journaled by bearing 108 on a central arbor 109. Arbor 109 is mounted through a spacer 110 to the inner face of each plate 88 and screws 112 connect the spacer to plate 88. Rollers 107 prevent the belt from dropping downwardly at the inside corner between conveyor sections 2 and 3. The position of the belt in the return run is not as critical as the position of the belt in the conveying run, but the rollers 107 prevent free fall of the belt at the inside corner.

Each roller 107 is enclosed by a generally L-shaped shield 113 that is connected through a plate 88 through a pair of angle shaped brackets 114. Screws 115 connect the brackets 114 to plate 88.

In addition to each roller 107, the return run of belt 6 is guided in movement by a tapered roller 116 which is mounted on conveyor section 2 and extends transversely across the conveyor section. As shown in FIG. 9, the ends of roller 116 taper inwardly toward the longitudinal center of the roller so that the central portion of the roller has a smaller diameter than the end portions. Roller 116 rides against the non-working surface of the return run of belt 6 and serves to create an upward bulge in the central portion of belt 6 and maintain tension on the side edge portions of the belt that ride against the rollers 107.

To mount roller 116, a dowel pin 117 is journaled within a recess in each end of roller 116, as shown in FIG. 9. The outer end of each dowel 117 is secured with an opening in spacer block 77. The lower edge of each inner plate 72 of conveyor section 2 is provided with a slot 118, which receives the respective dowel pin 117. With this construction, release of the bolts 78 will enable the spacer block 77 along with roller 116 to be removed from the conveyor section 2.

To adjust the position of conveyor section 2 with respect to conveyor section 3, the tension on belt 6 is released, and bolts 104 are loosened, thus permitting conveyor section 2 to be pivoted about the axis of shaft 99 to the desired angularity. Bolts 104 can then be retightened and the tension on the belt reestablished through the conventional belt tensioning mechanism.

While the drawings show the adjustable conveyor system including three sections 1, 2 and 3, it is contemplated that in some instances the conveyor system may only include sections 1 and 2, or sections 2 and 3.

The mechanism of the invention provides an infinite adjustment of conveyor section 2 through an angle of about 60°. Conveyor section 2 is pivoted with respect to conveyor section 1 about the axis of shaft 63, and thus the connection between the two conveyor sections is maintained during the pivotal action. As conveyor section 2 pivots relative to section 1, hold-down rollers 36 will move in a linear path relative to spindle 64 to thereby maintain belt 6 in engagement with the bed.

The rack and gear system for providing the movement of the hold down rollers 36 provides synchronization between both sides of the conveyor because the gears 66 are tied together through the shaft 63.

While the drawings show belt 6 as being a cleated type, it is contemplated that either flat or cleated belts can be utilized with the construction of the invention without modification of the structure.

We claim:

1. A conveyor system, comprising a first conveyor section and a second conveyor section, said second conveyor section being movable from a first position where said second conveyor section is in alignment with said first conveyor section to a second position where said second conveyor section is located at an angle with respect to said first conveyor section, said first conveyor section including a pair of first spaced parallel side members, said second conveyor section including a pair of second spaced parallel side members disposed in lapping relation with the respective first side members, a shaft connecting the lapping first and second side members, said second side members being mounted to rotate on said shaft, a spindle mounted for rotation on said shaft, a gear disposed concentrically of said shaft and secured to said second side members, a slide mounted for sliding movement relative to said first side members, an endless conveyor belt mounted for travel on said first and second conveyor sections and disposed in engagement with said spindle, hold down means carried by the slide and disposed to engage a portion of the belt passing over said spindle, and a rack carried by the slide and engaged with said gear, whereby pivotal movement of said second side members about said shaft will cause said gear to move said rack relative to said first side members to thereby move said hold down means relative to said spindle.

2. The conveyor system of claim 1, and including releasable locking means for locking said slide to said first side members.

3. The conveyor system of claim 1, wherein said hold down means comprises a pair of rollers, each roller positioned to engage a side edge of a working surface of said belt.

4. The conveyor system of claim 1, and including a first bed plate connecting said first side members and disposed to support said belt and a second bed plate connecting said second side members and disposed to support said belt, an end of said first bed plate being spaced from a corresponding end of said second bed plate, and said bed plates being disposed in a common plane when said conveyor sections are in an aligned position.

5. The conveyor system of claim 1, and including guide means interconnecting said slide and said first side members for guiding said slide in movement on said first side members.

6. The conveyor system of claim 1, and including a pair of said gears, each connected to an end of said shaft, said system also including a pair of said slides with each slide being connected to one of said first side members, said hold down means including a pair of hold down rollers each mounted for rotation on one of said slides, said system also including a pair of said racks, each rack engageable with one of said gears.

7. The conveyor system of claim 1, and including means for limiting the magnitude of pivotal movement of said second conveyor section relative to said first conveyor section.

8. A conveyor system, comprising a first conveyor section and a second conveyor section mounted for movement between an aligned position where said second conveyor section is aligned with said first conveyor section to an angular position where said second conveyor section is located at an angle with respect to said first conveyor section, a pivot shaft for pivotally connecting an end of the second conveyor section to an end of the first conveyor section, a spindle journaled on said shaft, an endless conveyor belt mounted to travel over said first and second conveyor sections and disposed in engagement with said spindle, hold-down means for holding said belt against said spindle, and means responsive to pivotal movement of said second conveyor section relative to said first conveyor section for moving said hold down means relative to said spindle to change the point of tangency between said hold down means and said spindle.

9. The conveyor system of claim 8, wherein said belt is trained over said first and second conveyor sections in an upper conveying run and a lower return run, said belt having a working surface and a non-working surface, and a plurality of cleats extending transversely across the belt and spaced longitudinally along the length of the belt.

10. The conveyor system of claim 9, and including a corrugated, flexible edge extending outwardly from each side edge of the working surface of the belt.

11. The conveyor system of claim 8, wherein said means responsive to pivotal movement of said second conveyor relative to said first conveyor section comprises a gear mounted on said second conveyor section and disposed concentrically of the axis of said shaft, a slide mounted for movement relative to said first conveyor section, said hold down means being mounted on said slide, and a rack carried by the slide and engaged with said gear, whereby pivotal movement of said second conveyor section relative to said first conveyor section will rotate said gear to thereby move said rack and change the point of tangency of said hold down means relative to said spindle.

12. The conveyor system of claim 11, wherein said hold down means comprises a rotatable roller to engage the working surface of said belt.

13. The conveyor system of claim 11, and including a pair of gears, each gear disposed at an end of said shaft, said system also including a pair of said slides with each slide carrying a rack, each rack being engaged with a corresponding gear.

14. A conveyor system, comprising a first conveyor section and a second conveyor section mounted for pivotal movement with respect to said first conveyor section from a first position wherein said second conveyor section is disposed in alignment with said first conveyor section to a second position where said second conveyor section extends at an inclined angle with respect to said first conveyor section, a pivot shaft for pivotally connecting an end of said second conveyor section to an end of the first conveyor section, a spindle journaled for rotation on said shaft, a belt mounted for travel on said first and second conveyor sections in an upper conveying run and a lower return run, said belt having a working surface and an opposite non-working surface, said belt disposed in engagement with said spindle, a pair of belt support members mounted on said second conveyor section, each belt support member disposed to engage a side edge portion of the working surface of the return run of said belt, and a tapered roller extending transversely of said first conveyor section and disposed to engage the non-working surface of the return run of the belt, the end portions of said tapered roller having a greater diameter than the central portion thereof, thereby causing the central portion of the belt to deflect upwardly and maintaining tension between the belt support members and the side edge portions of the belt.

15. The conveyor system of claim 14, and including a pair of side rails extending outwardly from the working surface of said belt, each side rail being spaced from a side edge of the belt, each belt support member disposed to engage the working surface of the return run of said belt at a location outward of the respective side rail.

16. The conveyor system of claim 15, and including a plurality of cleats extending outwardly from the working surface of the belt and extending transversely between said side rails.

17. The conveyor system of claim 14, wherein said belt support members are idler rollers.

18. The conveyor system of claim 14, wherein said tapered roller is disposed relative to said first conveyor section such that the angle between the longitudinal center line of the first conveyor section and the longitudinal center line of the second conveyor section is greater than the angle between the portion of the belt approaching said belt support members and the portion of the belt travelling between the belt support members and the tapered roller.

* * * * *